United States Patent
Tsukagoshi

(10) Patent No.: US 9,210,397 B2
(45) Date of Patent: Dec. 8, 2015

(54) IMAGE PROCESSING SYSTEM, APPARATUS, AND METHOD

(75) Inventor: Shinsuke Tsukagoshi, Tochigi (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 137 days.

(21) Appl. No.: 13/524,281

(22) Filed: Jun. 15, 2012

(65) Prior Publication Data

US 2012/0320043 A1 Dec. 20, 2012

(30) Foreign Application Priority Data

Jun. 15, 2011 (JP) ................................. 2011-133433

(51) Int. Cl.
*G06T 15/00* (2011.01)
*H04N 13/00* (2006.01)
*H04N 13/02* (2006.01)

(52) U.S. Cl.
CPC ....... *H04N 13/0011* (2013.01); *H04N 13/0275* (2013.01); *H04N 13/0282* (2013.01)

(58) Field of Classification Search
CPC combination set(s) only.
See application file for complete search history.

(56) References Cited

U.S. PATENT DOCUMENTS

| | | | |
|---|---|---|---|
| 7,525,541 B2 * | 4/2009 | Chun et al. | 345/419 |
| 2010/0110068 A1 * | 5/2010 | Yamauchi et al. | 345/419 |
| 2011/0235066 A1 * | 9/2011 | Sakuragi | 358/1.6 |

FOREIGN PATENT DOCUMENTS

| | | |
|---|---|---|
| JP | 7-182535 A | 7/1995 |
| JP | 9-146045 A | 6/1997 |
| JP | 2005-86414 | 3/2005 |

OTHER PUBLICATIONS

Office Action issued Apr. 14, 2015 in Japanese Patent Application No. 2011-133433.

* cited by examiner

*Primary Examiner* — Xiao Wu
*Assistant Examiner* — Mohammad H Akhavannik
(74) *Attorney, Agent, or Firm* — Oblon, McClelland, Maier & Neustadt, L.L.P.

(57) ABSTRACT

In an image processing system according to an embodiment, to generate an arbitrary parallax number of multi-parallax images from each piece of continuous time-phase volume data, a first parallax image generation control unit performs control so as to generate a parallax image arranged at a predetermined position in arrangement of a parallax image group corresponding to the multi-parallax images with respect to a pixel on a display unit from every arbitrary time-phase volume data. A second parallax image generation control unit performs control so as to generate a parallax image arranged at a different position from the predetermined position in the arrangement from volume data of a different time phase from the time phase in which the parallax image arranged at the predetermined position is controlled to be generated. A display control unit displays a parallax image group controlled to be generated on the display unit in time-phase order.

3 Claims, 11 Drawing Sheets

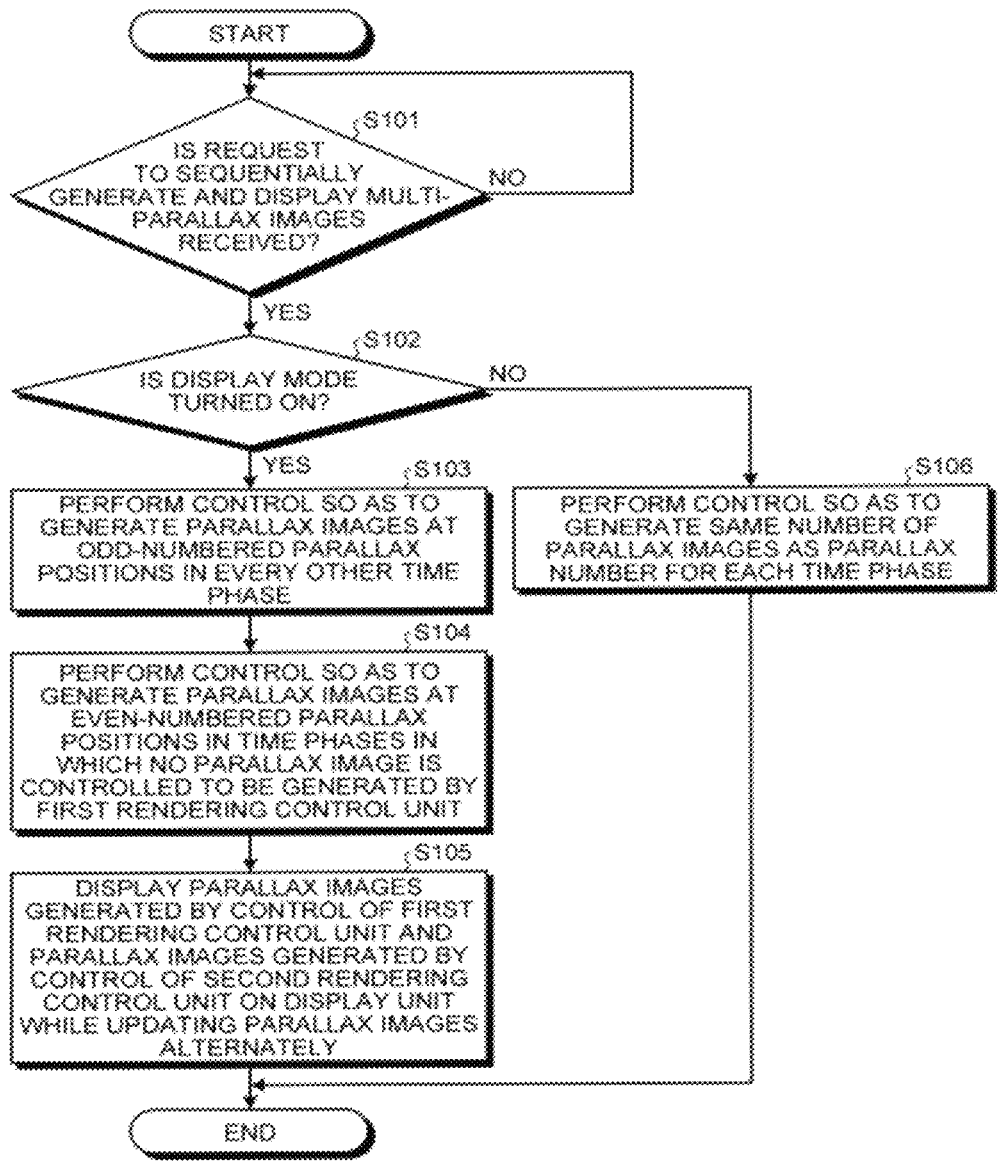

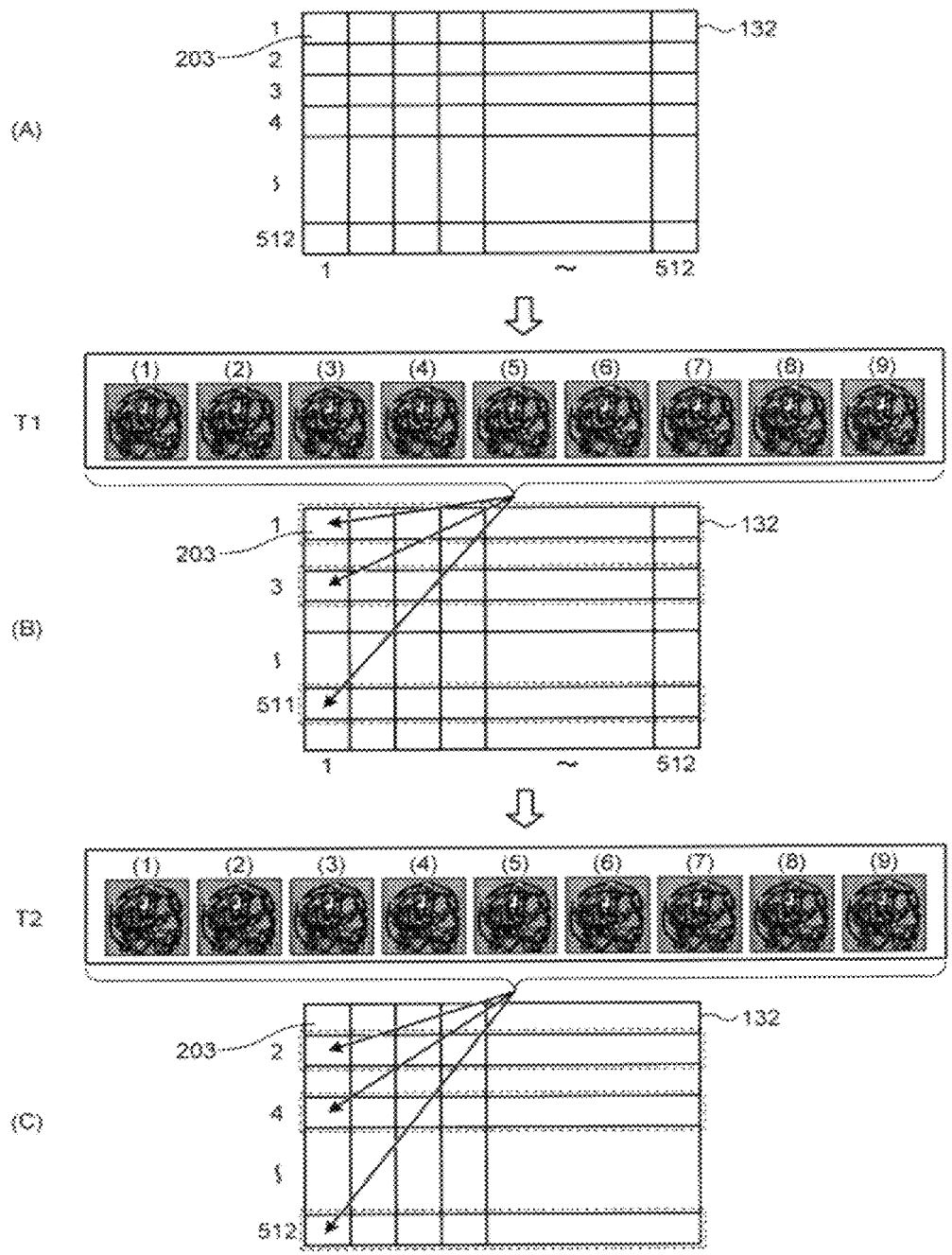

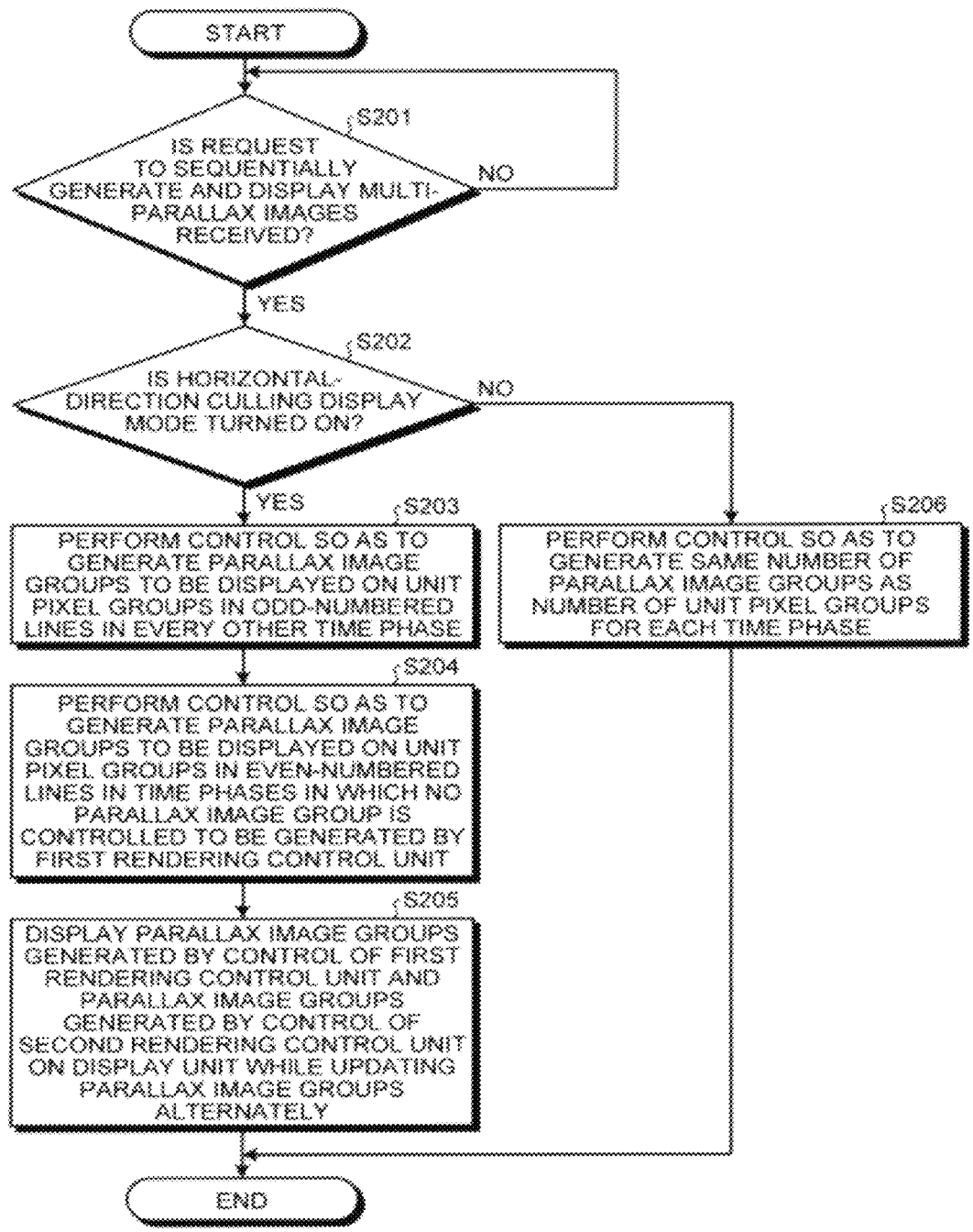

IMAGE PROCESSING SYSTEM, APPARATUS, AND METHOD

CROSS-REFERENCE TO RELATED APPLICATIONS

This application is based upon and claims the benefit of priority from Japanese Patent Application No. 2011-133433, filed on Jun. 15, 2011; the entire contents of which are incorporated herein by reference.

FIELD

Embodiments described herein relate generally to an image processing system, apparatus, and method.

BACKGROUND

Conventionally, monitors enabling an observer to view two-parallax images captured from two viewpoints stereoscopically by using a specific device, such as a pair of stereoscopic vision glasses, have been in practical use. Furthermore, in recent years, monitors enabling an observer to view multi-parallax images (e.g., nine-parallax images) captured from a plurality of viewpoints stereoscopically with the naked eyes by using a beam control element, such as a lenticular lens, have also been in practical use. Such two-parallax images and nine-parallax images displayed on monitors enabling stereoscopic vision may be generated by estimating depth information of an image captured from one viewpoint and performing image processing with the information thus estimated.

As for medical image diagnosis apparatuses, such as X-ray computed tomography (CT) apparatuses, magnetic resonance imaging (MRI) apparatuses, and ultrasound diagnosis apparatuses, apparatuses capable of generating three-dimensional medical image data (hereinafter, referred to as volume data) have been in practical use. Conventionally, volume data generated by such a medical image diagnosis apparatus is converted into a two-dimensional image by various types of image processing, and is displayed two-dimensionally on a general-purpose monitor. For example, volume data generated by a medical image diagnosis apparatus is converted into a two-dimensional image that reflects three-dimensional information by volume rendering processing, and is displayed two-dimensionally on a general-purpose monitor.

In the conventional technology, however, when sequential multi-parallax images are generated and displayed in real time, processing load may increase, thereby making it difficult to display the sequential multi-parallax images smoothly.

BRIEF DESCRIPTION OF THE DRAWINGS

FIG. 11 is a flow chart illustrating a process performed by the workstation according to the first embodiment;

FIG. 12 is a schematics for explaining an example of processing performed by a first rendering control unit and a second rendering control unit according to a second embodiment; and FIG. 13 is a flow chart illustrating a process performed by a workstation according to the second embodiment.

DETAILED DESCRIPTION

According to an embodiment, an image processing system includes a first parallax image generation control unit, a second parallax image generation control unit, and a display control unit. The first parallax image generation control unit configured to perform control so as to generate a parallax image arranged at a predetermined position in arrangement of a parallax image group corresponding to the multi-parallax images with respect to a pixel on a display unit from every arbitrary time-phase volume data, when generating an arbitrary parallax number of multi-parallax images from each piece of continuous time-phase volume data. The second parallax image generation control unit configured to perform control so as to generate a parallax image arranged at a different position from the position at which the parallax image is controlled to be generated by the first parallax image generation control unit in arrangement of the parallax image group from volume data of a different time phase from the time phase in which the parallax image is controlled to be generated by the first parallax image generation control unit. The display control unit configured to display a parallax image group controlled to be generated by the first parallax image generation control unit and the second parallax image generation control unit on the display unit in time-phase order.

Hereinafter, embodiments of an image processing system, apparatus, and method will be described in detail with reference to the accompanying drawings. In the following, an image processing system including a workstation with a function as an image processing apparatus is described as an embodiment. Here, the terminology used in the following embodiments is described. A "parallax image group" refers to an image group which is generated by performing a volume rendering process on volume data while moving a point-of-view position by a predetermined parallactic angle at a time. In other words, the "parallax image group" is configured with a plurality of "parallax images" having different "point-of-view positions." Further, a "parallactic angle" refers to an angle determined by an adjacent point-of-view position among point-of-view positions set to generate the "parallax image group" and a predetermined position in a space (the center of a space) represented by volume data. Further, a "parallax number" refers to the number of "parallax images"

necessary to implement a stereoscopic view by a stereoscopic display monitor. Further, a "nine-parallax image" described in the following refers to a "parallax image group" consisting of nine "parallax images." Furthermore, a "two-parallax image" described in the following refers to a "parallax image group" consisting of two "parallax images."

First Embodiment

Figure 1:
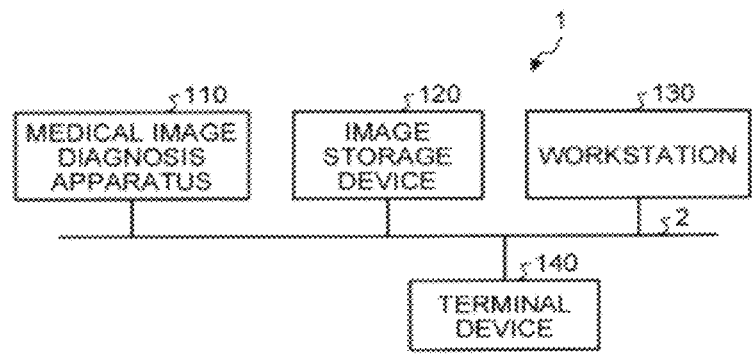
FIG. 1 is a diagram for explaining an exemplary configuration of an image processing system according to a first embodiment.

First, a configuration example of an image processing system according to a first embodiment will be described. FIG. 1 is a diagram for explaining an exemplary configuration of an image processing system according to a first embodiment.

As illustrated in FIG. 1, an image processing system 1 according to the first embodiment includes a medical image diagnosis apparatus 110, an image storage device 120, a workstation 130, and a terminal device 140. The respective devices illustrated in FIG. 1 are connected to directly or indirectly communicate one another, for example, via a hospital Local Area Network (LAN) 2 installed in a hospital. For example, when a Picture Archiving and Communication System (PACS) is introduced into the image processing system 1, the respective devices exchange a medical image or the like with one another according to a Digital Imaging and Communications in Medicine (DICOM) standard.

The image processing system 1 generates a parallax image group from volume data, which is three-dimensional medical image data, generated by the medical image diagnosis apparatus 110, and displays the parallax image group on a monitor enabling stereoscopic vision. Thus, the image processing system 1 provides a medical image capable of being viewed stereoscopically to a doctor or a laboratory technician who works for the hospital. Specifically, in the first embodiment, the workstation 130 performs various types of image processing on volume data to generate a parallax image group. The workstation 130 and the terminal device 140 have a monitor enabling stereoscopic vision, and display the parallax image group generated by the workstation 130 on the monitor. The image storage device 120 stores therein the volume data generated by the medical image diagnosis apparatus 110 and the parallax image group generated by the workstation 130. In other words, the workstation 130 and the terminal device 140 acquire the volume data and the parallax image group from the image storage device 120 to process the volume data and to display the parallax image group on the monitor. The devices will be explained below in order.

The medical image diagnosis apparatus 110 is an X-ray diagnosis apparatus, an X-ray Computed Tomography (CT) apparatus, a Magnetic Resonance Imaging (MRI) apparatus, an ultrasonic diagnostic device, a Single Photon Emission Computed Tomography (SPECT) device, a Positron Emission computed Tomography (PET) apparatus, a SPECT-CT apparatus in which a SPECT apparatus is integrated with an X-ray CT apparatus, a PET-CT apparatus in which a PET apparatus is integrated with an X-ray CT apparatus, a device group thereof, or the like. The medical image diagnosis apparatus 110 according to the first embodiment can generate 3D medical image data (volume data).

Specifically, the medical image diagnosis apparatus 110 according to the first embodiment captures a subject, and generates volume data. For example, the medical image diagnosis apparatus 110 generates volume data such that it collects data such as projection data or an MR signal by capturing a subject, and then reconstructs medical image data including a plurality of axial planes along a body axis direction of a subject based on the collected data. The medical image diagnosis apparatus 110 reconstructs medical image data of 500 axial planes, for example. The medical image data group of 500 axial planes corresponds to volume data. Alternatively, projection data or an MR signal of a subject captured by the medical image diagnosis apparatus 110 may be used as volume data.

The medical image diagnosis apparatus 110 according to the first embodiment transmits the generated volume data to the image storage device 120. When the medical image diagnosis apparatus 110 transmits the volume data to the image storage device 120, the medical image diagnosis apparatus 110 transmits supplementary information such as a patient ID identifying a patient, an inspection ID identifying an inspection, a apparatus ID identifying the medical image diagnosis apparatus 110, and a series ID identifying single shooting by the medical image diagnosis apparatus 110, for example.

The image storage device 120 is a database that stores a medical image. Specifically, the image storage device 120 according to the first embodiment stores volume data transmitted from the medical image diagnosis apparatus 110 in a storage unit to store the volume data therein. Further, in the first embodiment, the workstation 130 generates a parallax image group based on the volume data, and transmits the generated parallax image group to the image storage device 120. Thus, the image storage device 120 stores a parallax image group transmitted from the workstation 130 in the storage unit to store the parallax image group therein. Further, in the present embodiment, the workstation 130 capable of storing a large amount of images may be used, and in this case, the image storage device 120 illustrated in FIG. 1 may be incorporated with the workstation 130 illustrated in FIG. 1. In other words, in the present embodiment, the volume data or the parallax image group may be stored in the workstation 130.

Further, in the first embodiment, the volume data or the parallax image group stored in the image storage device 120 is stored in association with the patient ID, the inspection ID, the apparatus ID, the series ID, and the like. Thus, the workstation 130 or the terminal device 140 performs a search using the patient ID, the inspection ID, the apparatus ID, the series ID, or the like, and acquires necessary volume data or a necessary parallax image group from the image storage device 120.

The workstation 130 is an image processing apparatus that performs image processing on a medical image. Specifically, the workstation 130 according to the first embodiment performs various types of rendering processing on the volume data acquired from the image storage device 120 to generate a parallax image group. The parallax image group is a plurality of parallax images captured from a plurality of viewpoints. A parallax image group displayed on a monitor enabling an observer to view nine-parallax images stereoscopically with the naked eyes is nine parallax images whose viewpoint positions are different from one another.

The workstation 130 according to the first embodiment includes a monitor enabling stereoscopic vision (hereinafter, referred to as a stereoscopic display monitor) as a display unit. The workstation 130 generates a parallax image group, and displays the parallax image group thus generated on the stereoscopic display monitor. As a result, an operator of the workstation 130 can perform an operation for generating the parallax image group while checking a medical image that is displayed on the stereoscopic display monitor and capable of being viewed stereoscopically.

The workstation 130 transmits the parallax image group thus generated to the image storage device 120. When transmitting the parallax image group to the image storage device 120, the workstation 130 transmits the patient ID, the examination ID, the apparatus ID, and the series ID, for example, as additional information. Examples of the additional information transmitted when the workstation 130 transmits the parallax image group to the image storage device 120 include additional information related to the parallax image group. Examples of the additional information related to the parallax image group include the number of parallax images (e.g., "nine") and the resolution of the parallax image (e.g., "466× 350 pixels").

To generate and display multi-parallax images sequentially, the workstation 130 according to the first embodiment generates and displays parallax images of different parallax positions alternately between continuous time-phase data. As a result, the workstation 130 can display sequential multi-parallax images smoothly even if the sequential multi-parallax images are generated and displayed in real time. This operation will be described later in detail.

The terminal device 140 is a device that allows a doctor or a laboratory technician who works in the hospital to view a medical image. Examples of the terminal device 140 include a Personal Computer (PC), a tablet-type PC, a Personal Digital Assistant (PDA), and a portable telephone, which are operated by a doctor or a laboratory technician who works in the hospital. Specifically, the terminal device 140 according to the first embodiment includes a stereoscopic display monitor as a display unit. Further, the terminal device 140 acquires a parallax image group from the image storage device 120, and causes the acquired parallax image group to be displayed on the stereoscopic display monitor. As a result, a doctor or a laboratory technician who is an observer can view a stereoscopically viewable medical image.

Here, the stereoscopic display monitor included in the workstation 130 or the terminal device 140 will be described. A general-purpose monitor which is currently most widely used two dimensionally displays a two-dimensional (2D) image and hardly performs a 3D display on a 2D image. If an observer desires a stereoscopic view to be displayed on the general-purpose monitor, a device that outputs an image to the general-purpose monitor needs to parallel-display a two-parallax image stereoscopically viewable to an observer through a parallel method or an intersection method. Alternatively, a device that outputs an image to the general-purpose monitor needs to display an image stereoscopically viewable to an observer through a color-complementation method using glasses in which a red cellophane is attached to a left-eye portion and a blue cellophane is attached to a right-eye portion.

Meanwhile, there are stereoscopic display monitors that allow a two-parallax image (which is also referred to as a "binocular parallax image") to be stereoscopically viewed using a dedicated device such as stereoscopic glasses.

Figure 2A:
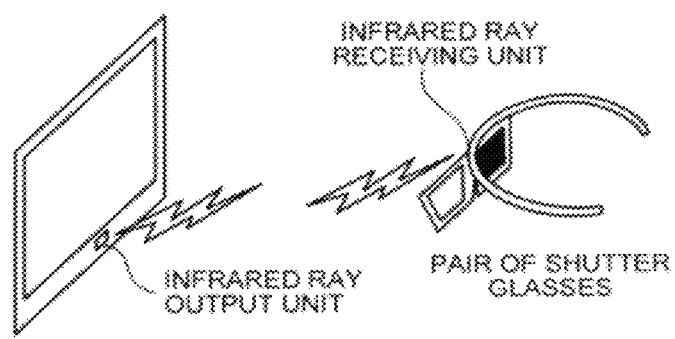
FIG. 2A and FIG. 2B are schematics for explaining an example of a stereoscopic display monitor that performs stereoscopic display using two-parallax images.
Figure 2B:
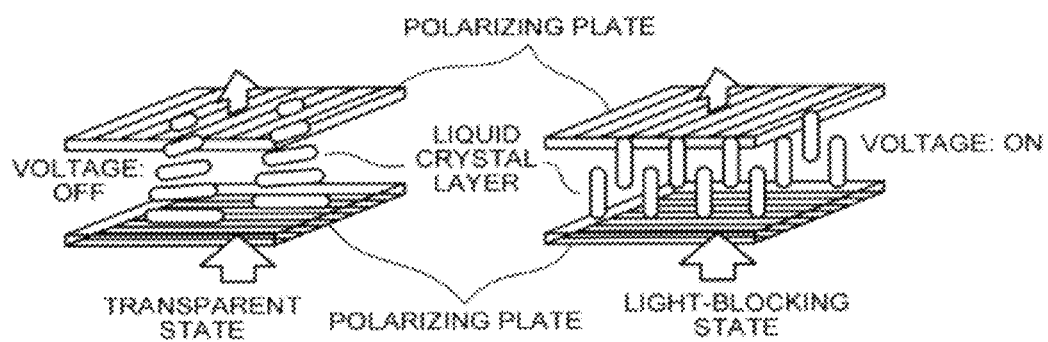

FIG. 2A and FIG. 2B are schematics for explaining an example of a stereoscopic display monitor that performs stereoscopic display using two-parallax images. In the example illustrated in FIGS. 2A and 2B, the stereoscopic display monitor performs a stereoscopic display by a shutter method, and shutter glasses are used as stereoscopic glasses worn by an observer who observes the monitor. The stereoscopic display monitor alternately outputs a two-parallax image in the monitor. For example, the monitor illustrated in FIG. 2A alternately outputs a left-eye image and a right-eye image with 120 Hz. As illustrated in FIG. 2A, the monitor includes an infrared-ray output unit, and controls an output of an infrared ray according to a timing at which images are switched.

The infrared ray output from the infrared-ray output unit is received by an infrared-ray receiving unit of the shutter glasses illustrated in FIG. 2A. A shutter is mounted to each of right and left frames of the shutter glasses, and the shutter glasses alternately switch a transmission state and a light shielding state of the right and left shutters according to a timing at which the infrared-ray receiving unit receives the infrared ray. A switching process of a transmission state and a light shielding state of the shutter will be described below.

As illustrated in FIG. 2B, each shutter includes an incident side polarizing plate and an output side polarizing plate, and further includes a liquid crystal layer disposed between the incident side polarizing plate and the output side polarizing plate. The incident side polarizing plate and the output side polarizing plate are orthogonal to each other as illustrated in FIG. 2B. Here, as illustrated in FIG. 2B, in an OFF state in which a voltage is not applied, light has passed through the incident side polarizing plate rotates at 90° due to an operation of the liquid crystal layer, and passes through the output side polarizing plate. In other words, the shutter to which a voltage is not applied becomes a transmission state.

Meanwhile, as illustrated in FIG. 2B, in an ON state in which a voltage is applied, a polarization rotation operation caused by liquid crystal molecules of the liquid crystal layer does not work, and thus light having passed through the incident side polarizing plate is shielded by the output side polarizing plate. In other words, the shutter to which a voltage is applied becomes a light shielding state.

In this regard, for example, the infrared-ray output unit outputs the infrared ray during a time period in which the left-eye image is being displayed on the monitor. Then, during a time period in which the infrared ray is being received, the infrared-ray receiving unit applies a voltage to the right-eye shutter without applying a voltage to the left-eye shutter. Through this operation, as illustrated in FIG. 2A, the right-eye shutter becomes the light shielding state, and the left-eye shutter becomes the transmission state, so that the left-eye image is incident to the left eye of the observer. Meanwhile, during a time period in which the right-eye image is being displayed on the monitor, the infrared-ray output unit stops an output of the infrared ray. Then, during a time period in which the infrared ray is not being received, the infrared-ray receiving unit applies a voltage to the left-eye shutter without applying a voltage to the right-eye shutter. Through this operation, the left-eye shutter becomes the light shielding state, and the right-eye shutter becomes the transmission state, so that the right-eye image is incident to the right eye of the observer. As described above, the stereoscopic display monitor illustrated in FIGS. 2A and 2B causes an image stereoscopically viewable to the observer to be displayed by switching an image to be displayed on the monitor in conjunction with the state of the shutter. A monitor employing a polarizing glasses method other than the shutter method is also known as the stereoscopic display monitor that allows a two-parallax image to be stereoscopically viewed.

Further, a stereoscopic display monitor that allows an observer to stereoscopically view a multi-parallax image with the naked eyes such as a nine-parallax image using a light beam controller such as a lenticular lens has been recently put to practical. This kind of stereoscopic display monitor makes a stereoscopic view possible by binocular parallax, and further makes a stereoscopic view possible by kinematic parallax in which an observed video changes with the movement of a point of view of an observer.

Figure 3:
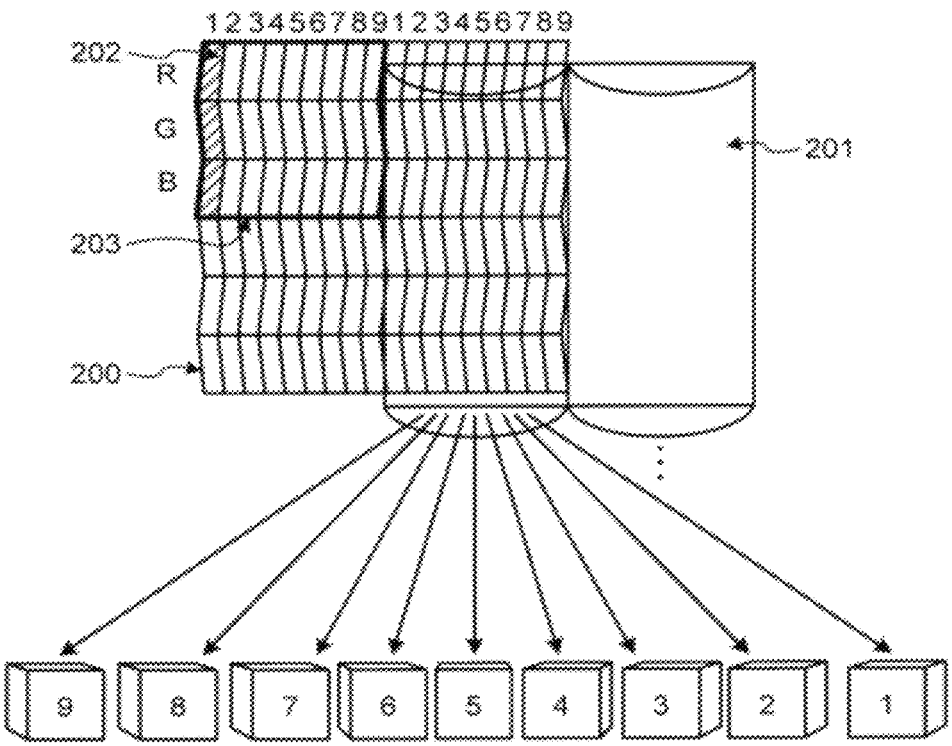
FIG. 3 is a schematic for explaining an example of a stereoscopic display monitor that performs stereoscopic display using nine-parallax images.

FIG. 3 is a schematic for explaining an example of a stereoscopic display monitor that performs stereoscopic display using nine-parallax images. In the stereoscopic display monitor illustrated in FIG. 3, a light beam controller is arranged in front of a planar display surface 200 such as a liquid crystal panel. For example, in the stereoscopic display monitor illustrated in FIG. 3, a vertical lenticular sheet 201 including an optical opening that extends in a vertical direction is attached to the front surface of the display surface 200 as the light beam controller.

As illustrated in FIG. 3, in the display surface 200, an aspect ratio is 3:1, and pixels 202 each of which includes three sub-pixels of red (R), green (G), and blue (B) arranged in a longitudinal direction are arranged in the form of a matrix. The stereoscopic display monitor illustrated in FIG. 3 converts a nine-parallax image including nine images into an interim image arranged in a predetermined format (for example, in a lattice form), and outputs the interim image to the display surface 200. In other words, the stereoscopic display monitor illustrated in FIG. 3 allocates nine pixels at the same position in the nine-parallax image to the pixels 202 of nine columns, respectively, and then performs an output. The pixels 202 of nine columns become a unit pixel group 203 to simultaneously display nine images having different point-of-view positions.

The nine-parallax image simultaneously output as the unit pixel group 203 in the display surface 200 is radiated as parallel light through a Light Emitting Diode (LED) backlight, and further radiated in multiple directions through the vertical lenticular sheet 201. As light of each pixel of the nine-parallax image is radiated in multiple directions, lights incident to the left eye and the right eye of the observer change in conjunction with the position (the position of the point of view) of the observer. In other words, depending on an angle at which the observer views, a parallax image incident to the right eye differs in a parallactic angle from a parallax image incident to the left eye. Through this operation, the observer can stereoscopically view a shooting target, for example, at each of nine positions illustrated in FIG. 3. For example, the observer can stereoscopically view, in a state in which the observer directly faces a shooting target, at the position of "5" illustrated in FIG. 3, and can stereoscopically view, in a state in which a direction of a shooting target is changed, at the positions other than "5" illustrated in FIG. 3. The stereoscopic display monitor illustrated in FIG. 3 is merely an example. The stereoscopic display monitor that displays the nine-parallax image may include a horizontal stripe liquid crystal of "RRR..., GGG..., and BBB..." as illustrated in FIG. 3 or may include a vertical stripe liquid crystal of "RGBRGB...." Further, the stereoscopic display monitor illustrated in FIG. 3 may be of a vertical lens type in which a lenticular sheet is vertical as illustrated in FIG. 3 or may be of an oblique lens type in which a lenticular sheet is oblique.

The configuration example of the image processing system 1 according to the first embodiment has been briefly described so far. An application of the image processing system 1 described above is not limited to a case in which the PACS is introduced. For example, the image processing system 1 is similarly applied even to a case in which an electronic chart system for managing an electronic chart with a medical image attached thereto is introduced. In this case, the image storage device 120 serves as a database for managing an electronic chart. Further, for example, the image processing system 1 is similarly applied even to a case in which a Hospital Information System (HIS) or Radiology Information System (RIS) is introduced. Further, the image processing system 1 is not limited to the above-described configuration example. A function or an assignment of each device may be appropriately changed according to an operation form.

Figure 4:
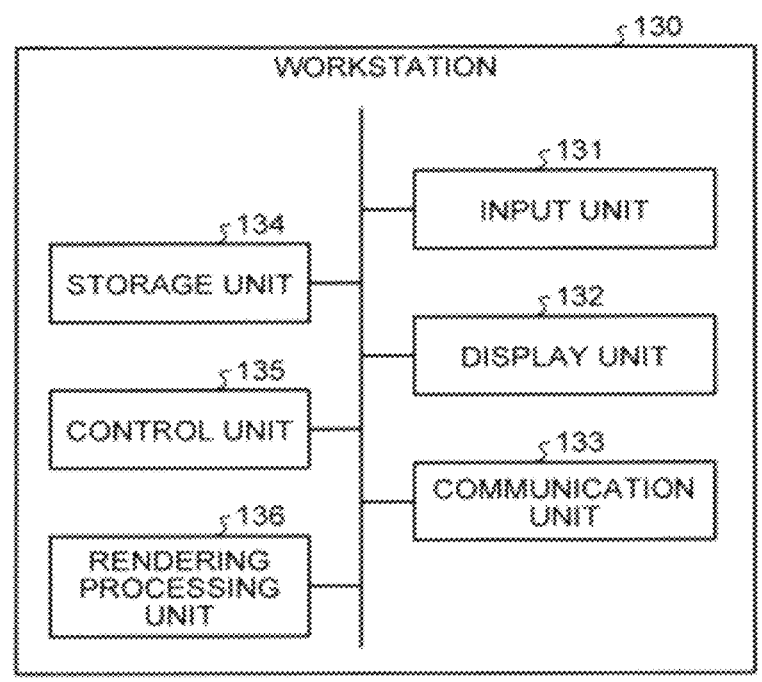
FIG. 4 is a diagram for explaining an exemplary configuration of a workstation according to the first embodiment.

Next, a configuration example of a workstation according to the first embodiment will be described with reference to FIG. 4. FIG. 4 is a diagram for explaining an exemplary configuration of a workstation according to the first embodiment. In the following, a "parallax image group" refers to an image group for a stereoscopic view generated by performing a volume rendering process on volume data. Further, a "parallax image" refers to each of images that configure the "parallax image group." In other words, the "parallax image group" is configured with a plurality of "parallax images" having different point-of-view positions.

The workstation 130 according to the first embodiment is a high-performance computer appropriate to image processing or the like, and includes an input unit 131, a display unit 132, a communication unit 133, a storage unit 134, a control unit 135, and a rendering processing unit 136 as illustrated in FIG. 4. In the following, a description will be made in connection with an example in which the workstation 130 is a high-performance computer appropriate to image processing or the like. However, the workstation 130 is not limited to this example, and may be an arbitrary information processing device. For example, the workstation 130 may be an arbitrary personal computer.

The input unit 131 includes a mouse, a keyboard, a trackball, or the like, and receives various operations which an operator has input on the workstation 130. Specifically, the input unit 131 according to the first embodiment receives an input of information used to acquire volume data which is a target of the rendering process from the image storage device 120. For example, the input unit 131 receives an input of the patient ID, the inspection ID, the apparatus ID, the series ID, or the like. Further, the input unit 131 according to the first embodiment receives an input of a condition (hereinafter, referred to as a "rendering condition") related to the rendering process.

The display unit 132 includes a liquid crystal panel serving as a stereoscopic display monitor, and displays a variety of information. Specifically, the display unit 132 according to the first embodiment displays a Graphical User Interface (GUI), which is used to receive various operations from the operator, a parallax image group, or the like. The communication unit 133 includes a Network Interface Card (NIC) or the like and performs communication with other devices.

The storage unit 134 includes a hard disk, a semiconductor memory device, or the like, and stores a variety of information. Specifically, the storage unit 134 according to the first embodiment stores the volume data acquired from the image storage device 120 through the communication unit 133. Further, the storage unit 134 according to the first embodiment stores volume data which is under the rendering process, a parallax image group generated by the rendering process, or the like.

The control unit 135 includes an electronic circuit such as a Central Processing Unit (CPU), a Micro Processing Unit (MPU), or a Graphics Processing Unit (GPU) or an integrated circuit such as an Application Specific Integrated Circuit (ASIC) or a Field Programmable Gate Array (FPGA). The control unit 135 controls the workstation 130 in general.

For example, the control unit 135 according to the first embodiment controls a display of the GUI on the display unit 132 or a display of a parallax image group. Further, for example, the control unit 135 controls transmission/reception of the volume data or the parallax image group to/from the image storage device 120, which is performed through the communication unit 133. Further, for example, the control unit 135 controls the rendering process performed by the rendering processing unit 136. Further, for example, the control unit 135 controls an operation of reading volume data from the storage unit 134 or an operation of storing a parallax image group in the storage unit 134.

In the first embodiment, the control unit 135 of the workstation 130 controls the rendering processing performed by the rendering processing unit 136, and cooperates with the rendering processing unit 136. Thus, the control unit 135 generates parallax images of different parallax positions alternately between continuous time-phase data and displays the parallax images on the display unit 132. This operation will be described later in detail.

The rendering processing unit 136 performs various rendering processes on volume data acquired from the image storage device 120 under control of the control unit 135, and thus generates a parallax image group. Specifically, the rendering processing unit 136 according to the first embodiment reads volume data from the storage unit 134, and first performs pre-processing on the volume data. Next, the rendering processing unit 136 performs a volume rendering process on the pre-processed volume data, and generates a parallax image group. Subsequently, the rendering processing unit 136 generates a 2D image in which a variety of information (a scale, a patient name, an inspection item, and the like) is represented, and generates a 2D output image by superimposing the 2D image on each parallax image group. Then, the rendering processing unit 136 stores the generated parallax image group or the 2D output image in the storage unit 134. Further, in the first embodiment, the rendering process refers to the entire image processing performed on the volume data, and the volume rendering process a process of generating a 2D image in which 3D information is reflected during the rendering process. For example, the medical image generated by the rendering process corresponds to a parallax image.

Figure 5:
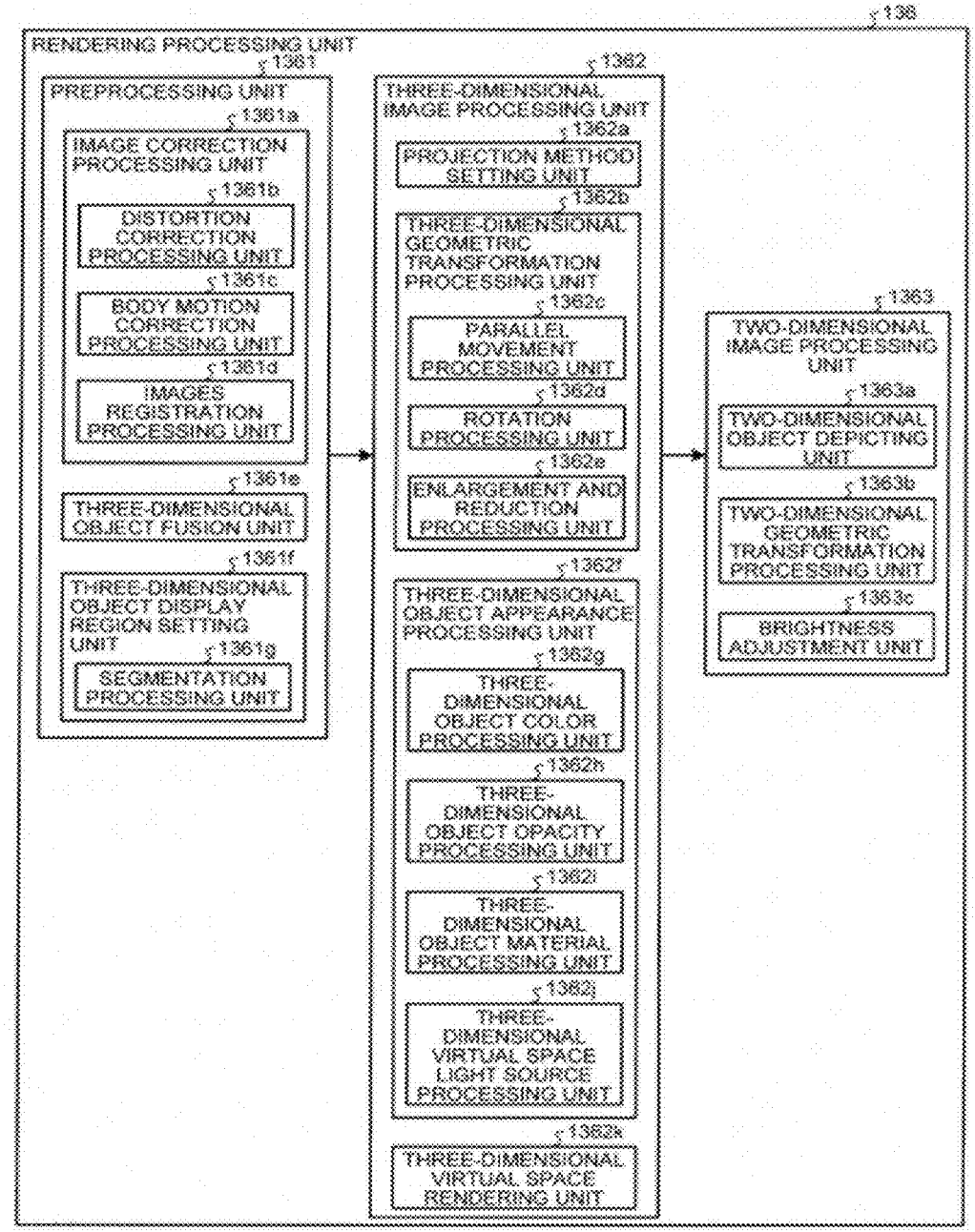
FIG. 5 is a diagram for explaining an exemplary configuration of a rendering processing unit illustrated in FIG. 4.

FIG. 5 is a diagram for explaining an exemplary configuration of a rendering processing unit illustrated in FIG. 4. As illustrated in FIG. 5, the rendering processing unit 136 includes a pre-processing unit 1361, a 3D image processing unit 1362, and a 2D image processing unit 1363. The pre-processing unit 1361 performs pre-processing on volume data. The 3D image processing unit 1362 generates a parallax image group from pre-processed volume data. The 2D image processing unit 1363 generates a 2D output image in which a variety of information is superimposed on a parallax image group. The respective units will be described below in order.

The pre-processing unit 1361 is a processing unit that performs a variety of pre-processing when performing the rendering process on volume data, and includes an image correction processing unit 1361a, a 3D object fusion unit 1361e, and a 3D object display area setting unit 1361f.

The image correction processing unit 1361a is a processing unit that performs an image correction process when processing two types of volume data as one volume data, and includes a distortion correction processing unit 1361b, a body motion correction processing unit 1361c, and an inter-image positioning processing unit 1361d as illustrated in FIG. 5. For example, the image correction processing unit 1361a performs an image correction process when processing volume data of a PET image generated by a PET-CT apparatus and volume data of an X-ray CT image as one volume data. Alternatively, the image correction processing unit 1361a performs an image correction process when processing volume data of a T1-weighted image and volume data of a T2-weighted image which are generated by an MRI apparatus as one volume data.

Further, the distortion correction processing unit 1361b corrects distortion of individual volume data caused by a collection condition at the time of data collection by the medical image diagnosis apparatus 110. Further, the body motion correction processing unit 1361c corrects movement caused by body motion of a subject during a data collection time period used to generate individual volume data. Further, the inter-image positioning processing unit 1361d performs positioning (registration), for example, using a cross correlation method between two pieces of volume data which have been subjected to the correction processes by the distortion correction processing unit 1361b and the body motion correction processing unit 1361c.

The 3D object fusion unit 1361e performs the fusion of a plurality of volume data which have been subjected to the positioning by the inter-image positioning processing unit 1361d. Further, the processes performed by the image correction processing unit 1361a and the 3D object fusion unit 1361e may not be performed when the rendering process is performed on single volume data.

The 3D object display area setting unit 1361f is a processing unit that sets a display area corresponding to a display target organ designated by an operator, and includes a segmentation processing unit 1361g. The segmentation processing unit 1361g is a processing unit that extracts an organ, such as a heart, a lung, or a blood vessel, which is designated by the operator, for example, by an area extension technique based on a pixel value (voxel value) of volume data.

Further, the segmentation processing unit 1361g does not perform the segmentation process when a display target organ has not been designated by the operator. Further, the segmentation processing unit 1361g extracts a plurality of corresponding organs when a plurality of display target organs is designated by the operator. Further, the process performed by the segmentation processing unit 1361g may be re-executed at a fine adjustment request of the operator who has referred to a rendering image.

The 3D image processing unit 1362 performs the volume rendering process on the pre-processed volume data which has been subjected to the process performed by the pre-processing unit 1361. As processing units for performing the volume rendering process, the 3D image processing unit 1362 includes a projection method setting unit 1362a, a 3D geometric transform processing unit 1362b, a 3D object appearance processing unit 1362f, and a 3D virtual space rendering unit 1362k.

The projection method setting unit 1362a determines a projection method for generating a parallax image group. For example, the projection method setting unit 1362a determines whether the volume rendering process is to be executed using a parallel projection method or a perspective projection method.

The 3D geometric transform processing unit 1362b is a processing unit that determines information necessary to perform 3D geometric transform on volume data which is to be subjected to the volume rendering process, and includes a parallel shift processing unit 1362c, a rotation processing unit 1362d, and a scaling processing unit 1362e. The parallel shift processing unit 1362c is a processing unit that determines a shift amount to shift volume data in parallel when a point-of-view position is shifted in parallel at the time of the volume rendering process. The rotation processing unit 1362d is a processing unit that determines a movement amount for rotationally moving volume data when a point-of-view position is rotationally moved at the time of the volume rendering process. Further, the scaling processing unit 1362e is a processing unit that determines an enlargement ratio or a reduction ratio of volume data when it is requested to enlarge or reduce a parallax image group.

The 3D object appearance processing unit 1362f includes a 3D object color processing unit 1362g, a 3D object opacity processing unit 1362h, a 3D object quality-of-material processing unit 1362i, and a 3D virtual space light source processing unit 1362*j*. The 3D object appearance processing unit 1362*f* performs a process of determining a display form of a parallax image group to be displayed through the above processing units, for example, according to the operator's request.

The 3D object color processing unit 1362*g* is a processing unit that determines a color colored to each area segmented from volume data. The 3D object opacity processing unit 1362*h* is a processing unit that determines opacity of each voxel configuring each area segmented from volume data. In volume data, an area behind an area having opacity of "100%" is not represented in a parallax image group. Further, in volume data, an area having opacity of "0%" is not represented in a parallax image group.

The 3D object quality-of-material processing unit 1362*i* is a processing unit that determines the quality of a material of each area segmented from volume data and adjusts the texture when the area is represented. The 3D virtual space light source processing unit 1362*j* is a processing unit that determines the position or the type of a virtual light source installed in a 3D virtual space when the volume rendering process is performed on volume data. Examples of the type of a virtual light source include a light source that emits a parallel beam from infinity and a light source that emits a radial beam from a point of view.

The 3D virtual space rendering unit 1362*k* performs the volume rendering process on volume data, and generates a parallax image group. Further, the 3D virtual space rendering unit 1362*k* uses a variety of information, which is determined by the projection method setting unit 1362*a*, the 3D geometric transform processing unit 1362*b*, and the 3D object appearance processing unit 1362*f*, as necessary when the volume rendering process is performed.

Here, the volume rendering process performed by the 3D virtual space rendering unit 1362*k* is performed according to the rendering condition. For example, the parallel projection method or the perspective projection method may be used as the rendering condition. Further, for example, a reference point-of-view position, a parallactic angle, and a parallax number may be used as the rendering condition. Further, for example, a parallel shift of a point-of-view position, a rotational movement of a point-of-view position, an enlargement of a parallax image group, and a reduction of a parallax image group may be used as the rendering condition. Further, for example, a color colored, transparency, the texture, the position of a virtual light source, and the type of virtual light source may be used as the rendering condition. The rendering condition may be input by the operator through the input unit 131 or may be initially set. In either case, the 3D virtual space rendering unit 1362*k* receives the rendering condition from the control unit 135, and performs the volume rendering process on volume data according to the rendering condition. Further, at this time, the projection method setting unit 1362*a*, the 3D geometric transform processing unit 1362*b*, and the 3D object appearance processing unit 1362*f* determine a variety of necessary information according to the rendering condition, and thus the 3D virtual space rendering unit 1362*k* generates a parallax image group using a variety of information determined.

Figure 6:
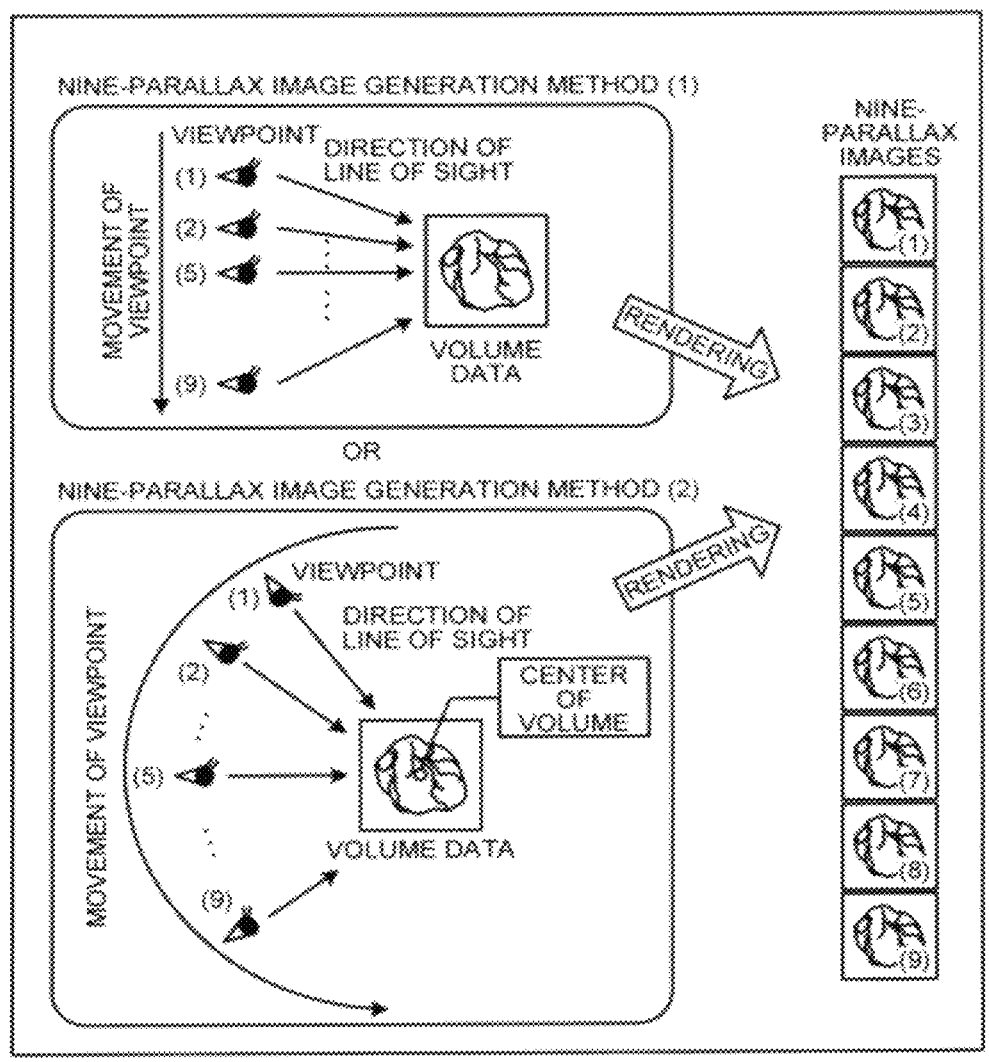
FIG. 6 is a schematic for explaining an example of volume rendering processing according to the first embodiment.

FIG. 6 is a schematic for explaining an example of volume rendering processing according to the first embodiment. For example, let us assume that the 3D virtual space rendering unit 1362*k* receives the parallel projection method as the rendering condition, and further receives a reference point-of-view position (5) and a parallactic angle "1°" as illustrated in a "nine-parallax image generating method (1)" of FIG. 6. In this case, the 3D virtual space rendering unit 1362*k* shifts the position of a point of view to (1) to (9) in parallel so that the parallactic angle can be changed by and generates nine parallax images between which the parallactic angle (an angle in a line-of-sight direction) differs from each other by 1° by the parallel projection method. Further, when the parallel projection method is performed, the 3D virtual space rendering unit 1362*k* sets a light source that emits a parallel beam in a line-of-sight direction from infinity.

Alternatively, the 3D virtual space rendering unit 1362*k* receives the perspective projection method as the rendering condition, and further receives a reference point-of-view position (5) and a parallactic angle "1°" as illustrated in a "nine-parallax image generating method (2)" of FIG. 6. In this case, the 3D virtual space rendering unit 1362*k* rotationally moves the position of a point of view to (1) to (9) so that the parallactic angle can be changed by "1°" centering on the center (gravity center) of volume data, and generates nine parallax images between which the parallactic angle differs from each other by 1° by the perspective projection method. Further, when the perspective projection method is performed, the 3D virtual space rendering unit 1362*k* sets a point light source or a surface light source, which three-dimensionally emits light in a radial manner centering on a line-of-sight direction, at each point of view. Further, when the perspective projection method is performed, the points of view (1) to (9) may be parallel-shifted according to the rendering condition.

Further, the 3D virtual space rendering unit 1362*k* may perform the volume rendering process using the parallel projection method and the perspective projection method together by setting a light source that two-dimensionally emits light in a radial manner centering on the line-of-sight direction on a longitudinal direction of a volume rendering image to display, and emits a parallel beam in the line-of-sight direction from infinity on a transverse direction of a volume rendering image to display.

The nine parallax images generated in the above-described way configure a parallax image group. In the first embodiment, for example, the nine parallax images are converted into interim images arranged in a predetermined format (for example, a lattice form) by the control unit 135, and then output to the display unit 132 serving as the stereoscopic display monitor. At this time, the operator of the workstation 130 can perform an operation of generating a parallax image group while checking a stereoscopically viewable medical image displayed on the stereoscopic display monitor.

The example of FIG. 6 has been described in connection with the case in which the projection method, the reference point-of-view position, and the parallactic angle are received as the rendering condition. However, similarly even when any other condition is received as the rendering condition, the 3D virtual space rendering unit 1362*k* generates the parallax image group while reflecting each rendering condition.

Subsequently, the parallax image group which the 3D image processing unit 1362 has generated based on the volume data is regarded as an underlay. Then, an overlay in which a variety of information (a scale, a patient name, an inspection item, and the like) is represented is superimposed on the underlay, so that a 2D output image is generated. The 2D image processing unit 1363 is a processing unit that performs image processing on the overlay and the underlay and generates a 2D output image, and includes a 2D object rendering unit 1363*a*, a 2D geometric transform processing unit 1363*b*, and a brightness adjusting unit 1363*c* as illustrated in FIG. 5. For example, in order to reduce a load required in a process of generating a 2D output image, the 2D image processing unit 1363 generates nine 2D output images by superimposing one overlay on each of nine parallax images (underlays). In the following, an underlay on which an overlay is superimposed may be referred to simply as a "parallax image."

The 2D object rendering unit 1363a is a processing unit that renders a variety of information represented on the overlay. The 2D geometric transform processing unit 1363b is a processing unit that parallel-shifts or rotationally moves the position of a variety of information represented on the overlay, or enlarges or reduces a variety of information represented on the overlay.

The brightness adjusting unit 1363c is a processing unit that performs a brightness converting process. For example, the brightness adjusting unit 1363c adjusts brightness of the overlay and the underlay according to an image processing parameter such as gradation of a stereoscopic display monitor of an output destination, a window width (WW), or a window level (WL).

The two-dimensional images to be output that are generated in this manner are temporarily stored in the storage unit 134 by the control unit 135, for example, and are transmitted to the image storage device 120 via the communication unit 133. If the terminal device 140 acquires the two-dimensional images to be output from the image storage device 120, converts the two-dimensional images into an intermediate image in which the two-dimensional images are arranged in a predetermined format (for example, a lattice form), and displays the intermediate image on the stereoscopic display monitor, for example, the doctor or the laboratory technician who is the observer can browse the medical image capable of being viewed stereoscopically with the various types of information (e.g., a scale, a patient's name, and an examination item) depicted thereon.

Figure 7:
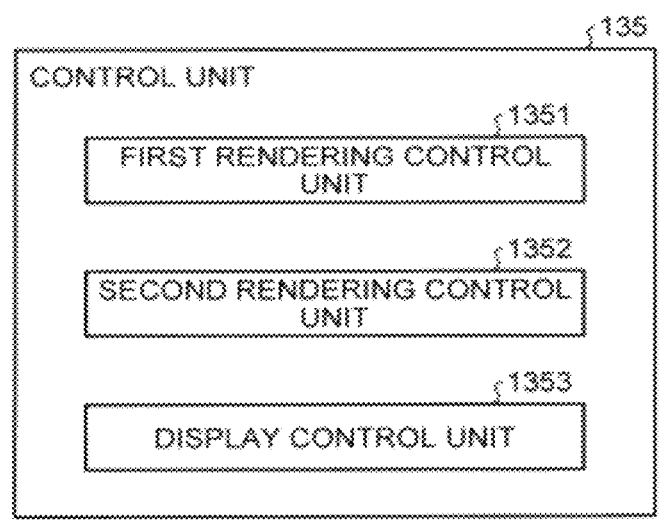
FIG. 7 is a diagram for explaining an exemplary configuration of a control unit according to the first embodiment.

As described above, the rendering processing unit 136 generates a parallax image group from volume data under the control of the control unit 135. The control unit 135 according to the first embodiment will now be described in detail. FIG. 7 is a diagram for explaining an exemplary configuration of the control unit 135 according to the first embodiment.

As illustrated in FIG. 7, the control unit 135 includes a first rendering control unit 1351, a second rendering control unit 1352, and a display control unit 1353. The control unit 135 performs control so as to generate and display parallax images of different parallax positions alternately between continuous time-phase data.

Figure 8:
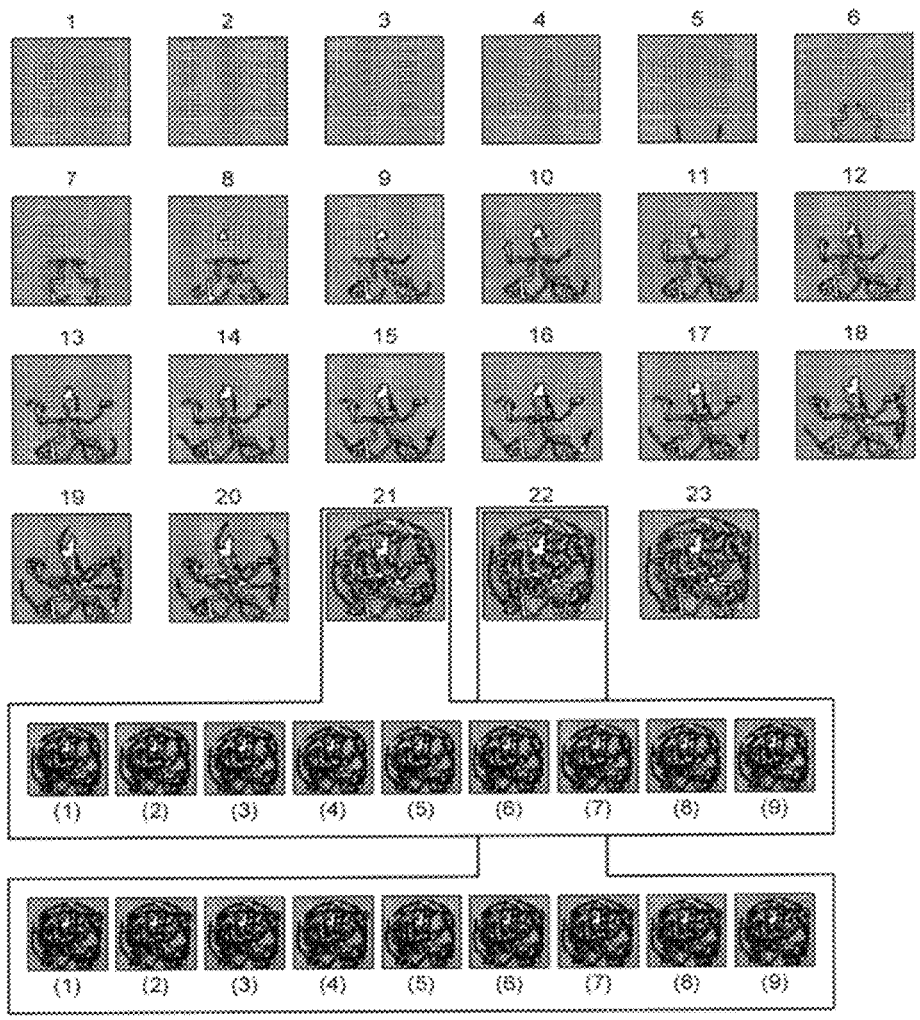
FIG. 8 is a schematic for explaining processing load generated when sequential multi-parallax images are generated and displayed in real time.

Processing load generated when sequential multi-parallax images are generated and displayed in real time will now be described. FIG. 8 is a schematic for explaining processing load generated when sequential multi-parallax images are generated and displayed in real time. FIG. 8 illustrates the case where parallax images to be displayed on a nine-parallax glasses-free 3D monitor are generated from 23 pieces of time-phase volume data. In this case, nine-parallax images are generated from each piece of 23 pieces of time-phase volume data. As illustrated by the 21st time phase and the 22nd time phase in FIG. 8, for example, control is performed such that nine parallax images of (1) to (9) are generated for one time phase and that the nine parallax images thus generated are displayed continuously for each time phase. Therefore, when sequential multi-parallax images are generated and displayed in real time, processing load may increase, thereby making it difficult to display the sequential multi-parallax images smoothly.

In the present application, control of the first rendering control unit 1351, the second rendering control unit 1352, and the display control unit 1353 illustrated in FIG. 7 makes it possible to display sequential multi-parallax images smoothly even if the sequential multi-parallax images are generated and displayed in real time. The first rendering control unit 1351 and the second rendering control unit 1352 illustrated in FIG. 7 are also referred to as a first parallax image generation control unit and a second parallax image generation control unit, respectively.

To generate an arbitrary parallax number of multi-parallax images from each piece of continuous time-phase volume data, the first rendering control unit 1351 performs control so as to generate parallax images arranged at predetermined positions in arrangement of a parallax image group corresponding to the multi-parallax images with respect to pixels on the display unit 132 from every arbitrary time-phase volume data. The first rendering control unit 1351, for example, controls the rendering processing unit 136 so as to generate parallax images arranged at odd-numbered positions in arrangement of the parallax image group from every other time-phase volume data.

By contrast, the second rendering control unit 1352 performs control so as to generate parallax images arranged at different positions from the positions at which the parallax images are controlled to be generated by the first rendering control unit 1351 in arrangement of the parallax image group with respect to the pixels on the display unit 132 from volume data of different time phases from the time phases in which the parallax images are controlled to be generated by the first rendering control unit 1351. The second rendering control unit 1352, for example, controls the rendering processing unit 136 so as to generate parallax images arranged at even-numbered positions in arrangement of the parallax image group.

Figure 9:
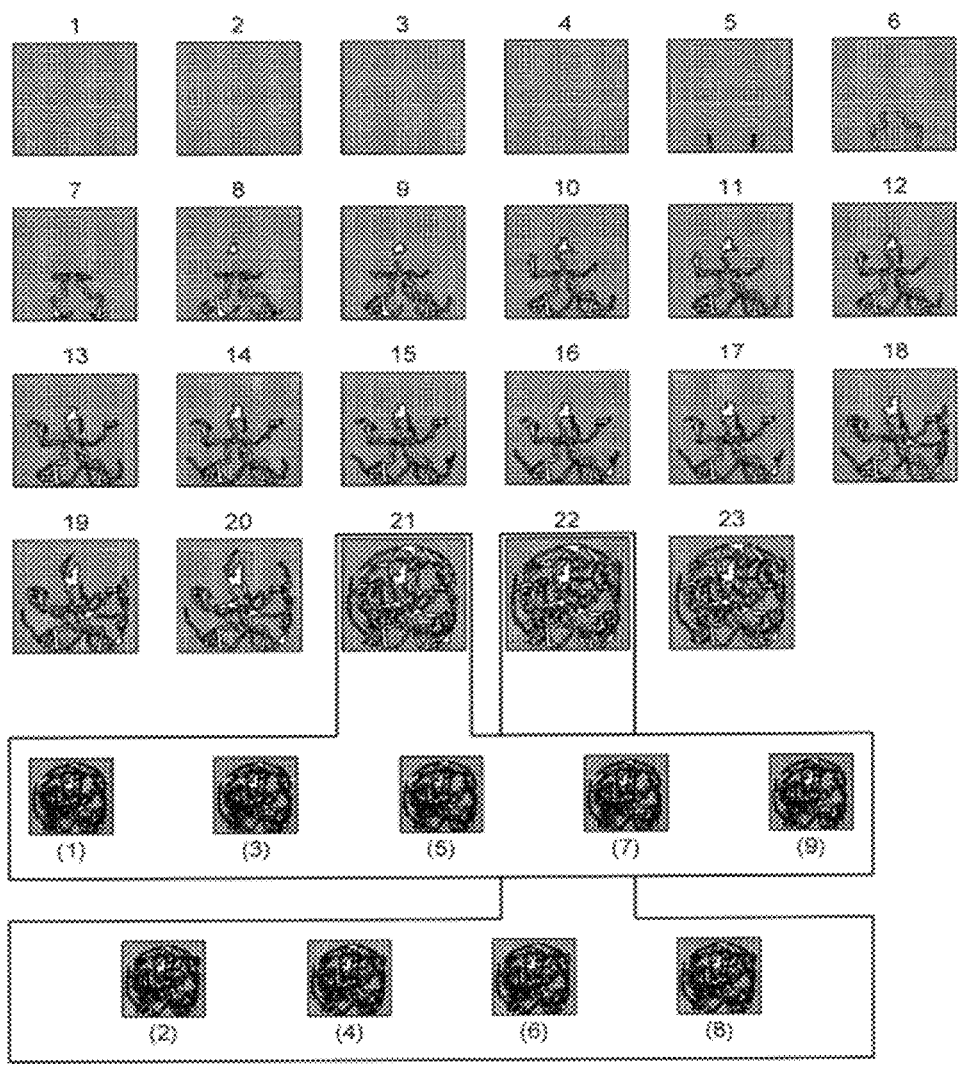
FIG. 9 is a schematic for explaining an example of processing performed by a first rendering control unit and a second rendering control unit according to the first embodiment.

FIG. 9 is a schematic for explaining an example of processing performed by a first rendering control unit and a second rendering control unit according to the first embodiment. FIG. 9 illustrates the case where parallax images to be displayed on a nine-parallax glasses-free 3D monitor are generated from 23 pieces of time-phase volume data. As illustrated by the 21st time phase in FIG. 9, for example, the first rendering control unit 1351 controls the rendering processing unit 136 so as to generate parallax images arranged at positions of (1), (3), (5), (7), and (9) from the 21st time-phase volume data. In the same manner as in the 21st time phase in FIG. 9, the first rendering control unit 1351 also controls the rendering processing unit 136 so as to generate parallax images arranged at positions of (1), (3), (5), (7), and (9) from the first, the third, the fifth, the seventh, the ninth, the 11th, the 13th, the 15th, the 17th, the 19th, and the 23rd time-phase volume data, which is not illustrated. At this time, parallax images arranged at positions of (1) to (9) may be generated in the first time phase, which is a time phase in which the multi-parallax images start to be displayed. This operation makes it possible to display an image from which no parallax image is culled out as an image displayed at the start of sequential display of the multi-parallax images.

By contrast, as illustrated by the 22nd time phase in FIG. 9, for example, the second rendering control unit 1352 controls the rendering processing unit 136 so as to generate parallax images arranged at positions of (2), (4), (6), and (8) from the 22nd time-phase volume data. In the same manner as in the 22nd time phase in FIG. 9, the second rendering control unit 1352 also controls the rendering processing unit 136 so as to generate parallax images arranged at positions of (2), (4), (6), and (8) from the second, the fourth, the sixth, the eighth, the tenth, the 12th, the 14th, the 16th, the 18th, and the 20th time-phase volume data, which is not illustrated.

Figure 10:
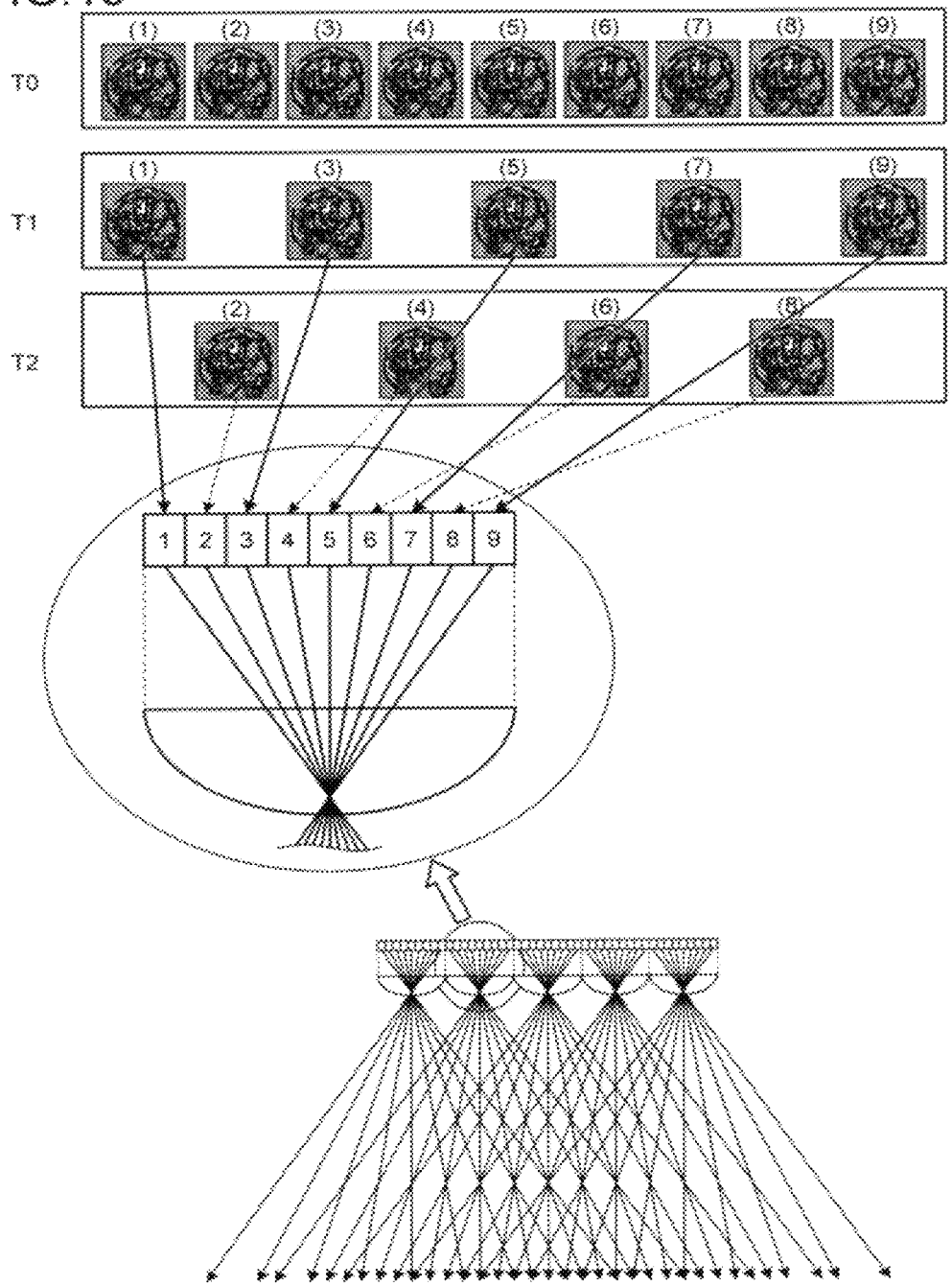
FIG. 10 is a schematic for explaining an example of processing performed by a display control unit according to the first embodiment.

Referring back to FIG. 7, the display control unit 1353 displays the parallax image groups controlled to be generated by the first rendering control unit 1351 and the second rendering control unit 1352 on the display unit 132 in time-phase order. Specifically, the display control unit 1353 updates the parallax image group controlled to be generated by the first rendering control unit 1351 and the parallax image group controlled to be generated by the second rendering control unit 1352 alternately to display the parallax image groups. FIG. 10 is a schematic for explaining an example of processing performed by a display control unit according to the first embodiment. FIG. 10 illustrates the state where parallax image groups of time phases T0 to T2 are updated on pixels 1 to 9 of nine columns provided to the display surface of the display unit 132. Time phase T0 is a time phase at the start of the display, and T1 and T2 are time phases in which time has elapsed since T0 in order.

If the parallax image groups of T0 to T2 illustrated in FIG. 10 are generated by control of the first rendering control unit 1351 and the second rendering control unit 1352, for example, the display control unit 1353 outputs to display parallax images (1) to (9) of T0 on pixels 1 to 9, respectively. The display control unit 1353 then outputs to display the parallax images (1), (3), (5), (7), and (9) of time phase T1 on the pixels 1, 3, 5, 7, and 9, respectively. At this time, the display control unit 1353 continues outputting to display the parallax images (2), (4), (6), and (8) of time phase T0 being output to be displayed on the pixels 2, 4, 6, and 8, respectively.

Subsequently, the display control unit 1353 outputs to display the parallax images (2), (4), (6), and (8) of time phase T2 on the pixels 2, 4, 6, and 8, respectively. At this time, the display control unit 1353 continues outputting to display the parallax images (1), (3), (5), (7), and (9) of time phase T1 being output to be displayed on the pixels 1, 3, 5, 7, and 9, respectively. In other words, the display control unit 1353 updates the parallax image groups generated for each time phase alternately, and displays the parallax image groups on the display unit 132.

The update of the parallax image groups described above is just an example, and update of the parallax image groups can be set arbitrarily. The display control unit 1353 for example, outputs to display the parallax images (1), (3), (5), (7), and (9) of time phase T1 illustrated in FIG. 10 on the pixels 1, 3, 5, 7, and 9, respectively, and outputs to display the parallax images (2), (4), (6), and (8) of time phase T2 on the pixels 2, 4, 6, and 8, respectively, as the parallax image group displayed at the start of display. The display control unit 1353 then updates parallax image groups of subsequent time phases alternately, and displays the parallax image groups on the display unit 132. Such update of the parallax image groups may be set based on a time difference while the parallax image groups are being updated (e.g., a time difference between time phase T1 and time phase T2), for example.

The processing performed by the workstation 130 according to the first embodiment will now be described with reference to FIG. 11. FIG. 11 is a flow chart illustrating the process performed by the workstation 130 according to the first embodiment. As illustrated in FIG. 11, if the workstation 130 according to the first embodiment receives a request to sequentially generate and display multi-parallax images (Yes at Step S101), the control unit 135 determines whether a display mode for generating and displaying parallax images of different parallax positions alternately between continuous time-phase data is turned ON (Step S102).

If the display mode is turned ON (Yes at Step S102), the first rendering control unit 1351 controls the rendering processing unit 136 so as to generate parallax images at odd-numbered parallax positions in every other time phase (Step S103).

The second rendering control unit 1352 controls the rendering processing unit 136 so as to generate parallax images at even-numbered parallax positions in time phases in which no parallax image is controlled to be generated by the first rendering control unit 1351 (Step S104).

Subsequently, the display control unit 1353 displays the parallax images generated by the control of the first rendering control unit 1351 and the parallax images generated by the control of the second rendering control unit 1352 on the display unit 132 while updating the parallax images alternately (Step S105), and the processing is terminated. The workstation 130 according to the first embodiment is in a standby mode until the workstation 130 receives a request to sequentially generate and display multi-parallax images (No at Step S101).

By contrast, if the display mode is turned OFF (No at Step S102), the control unit 135 controls the rendering processing unit 136 so as to generate the same number of parallax images as the parallax number for each time phase (Step S106), and the processing is terminated.

As described above, according to the first embodiment, to generate an arbitrary parallax number of multi-parallax images from each piece of continuous time-phase volume data, the first rendering control unit 1351 performs control so as to generate parallax images arranged at predetermined positions in arrangement of a parallax image group corresponding to the multi-parallax images with respect to the pixels on the display unit 132 from every arbitrary time-phase volume data. By contrast, the second rendering control unit 1352 performs control so as to generate parallax images arranged at different positions from the positions at which the parallax images are controlled to be generated by the first rendering control unit 1351 in arrangement of the parallax image group with respect to the pixels on the display unit 132 from volume data of different time phases from the time phases in which the parallax images are controlled to be generated by the first rendering control unit 1351. The display control unit 1353 displays the parallax image groups controlled to be generated by the first rendering control unit 1351 and the second rendering control unit 1352 on the display unit 132 in time-phase order. Therefore, the workstation 130 according to the first embodiment can reduce the number of rendering processing performed in one time phase, and can reduce the number of update of the parallax images to be output to be displayed. As a result, the workstation 130 can display sequential multi-parallax images smoothly even if the sequential multi-parallax images are generated and displayed in real time.

According to the first embodiment, the first rendering control unit 1351 performs control so as to generate parallax images arranged at odd-numbered positions in arrangement of the parallax image group with respect to the pixels on the display unit 132 from every other time-phase volume data. By contrast, the second rendering control unit 1352 generates parallax images arranged at even-numbered positions in arrangement of the parallax image group with respect to the pixels on the display unit 132. Therefore, the workstation 130 according to the first embodiment can generate an image that provides no feeling of strangeness to the operator as an image to be displayed.

According to the first embodiment, the display control unit 1353 updates the parallax image group controlled to be generated by the first rendering control unit 1351 and the parallax image group controlled to be generated by the second rendering control unit 1352 for each time phase to display the parallax image groups. Therefore, the workstation 130 according to the first embodiment can display sequential multi-parallax images more smoothly even if the sequential multi-parallax images are generated and displayed in real time.

Second Embodiment

In the first embodiment, the explanation has been made of the case where a parallax image output to be displayed on one pixel in a unit pixel group 203 is updated for every arbitrary time phase. In the second embodiment, an explanation will be made of the case where a parallax image group output to be displayed on a unit pixel group 203 is updated for every arbitrary time phase. In the second embodiment, a control unit 135 has the same configuration as that of the control unit 135 according to the first embodiment. Therefore, in the second embodiment, control units that update a parallax image group output to be displayed on the unit pixel group 203 for every arbitrary time phase will be explained as a first rendering control unit 1351*a* and a second rendering control unit 1352*a*. In other words, the first rendering control unit 1351*a* and the second rendering control unit 1352*a* are obtained by adding functions to perform new processing to the first rendering control unit 1351 and the second rendering control unit 1352 illustrated in FIG. 7.

The first rendering control unit 1351*a* performs control so as to generate parallax image groups to be placed in unit pixel groups 203 arranged at odd-numbered positions in the vertical direction among the unit pixel groups 203 each composed of the same number of pixels as an arbitrary parallax number from every other time-phase volume data. In other words, if the unit pixel groups 203, each of which is aligned in the horizontal direction on a display unit 132, are divided into odd-numbered groups and even-numbered groups from the top, the first rendering control unit 1351*a* performs control so as to generate parallax image groups to be placed in the unit pixel groups 203 arranged at the odd-numbered positions from every other time-phase volume data.

By contrast, the second rendering control unit 1352*a* performs control so as to generate parallax image groups to be placed in unit pixel groups 203 arranged at even-numbered positions in the vertical direction among the unit pixel groups 203. In other words, if the unit pixel groups 203, each of which is aligned in the horizontal direction on the display unit 132, are divided into odd-numbered groups and even-numbered groups from the top, the second rendering control unit 1352*a* performs control so as to generate parallax image groups to be placed in the unit pixel groups 203 arranged at the even-numbered positions from volume data of time phases in which no parallax image group is generated by the control of the first rendering control unit 1351*a*.

FIG. 12 is a schematics for explaining an example of processing performed by a first rendering control unit and a second rendering control unit according to a second embodiment. FIG. 12 illustrates processing performed when the display unit 132 has unit pixel groups 203 of 512 (width)×512 (height). Furthermore, "T1" and "T2" illustrated in FIG. 12 represent continuous time phases. As illustrated in FIG. 12(A), for example, if the display unit 132 has 512 unit pixel groups 203 in the vertical direction and 512 unit pixel groups 203 in the horizontal direction, the first rendering control unit 1351*a* generates parallax image groups as illustrated in FIG. 12(B).

Specifically, as illustrated in FIG. 12(B), the first rendering control unit 1351*a* performs control so as to generate parallax image groups to be displayed on unit pixel groups 203 included in odd-numbered lines (the first, the third, . . . , and the 511th) among the unit pixel groups 203 aligned in the horizontal direction from volume data of time phase T1. In other words, the first rendering control unit 1351*a* performs control so as to generate parallax image groups to be displayed on 512 unit pixel groups 203 included in each of the odd-numbered lines from the volume data of time phase T1. In subsequent time phases, the first rendering control unit 1351*a* performs control so as to generate parallax image groups to be displayed on 512 unit pixel groups 203 included in each of the odd-numbered lines in every other time phase from volume data of the time phase.

By contrast, as illustrated in FIG. 12(C), the second rendering control unit 1352*a* performs control so as to generate parallax image groups to be displayed on unit pixel groups included in even-numbered lines (the second, the fourth, . . . , and the 512th) among the unit pixel groups 203 aligned in the horizontal direction from volume data of time phase T2. In other words, the second rendering control unit 1352*a* performs control so as to generate parallax image groups to be displayed on 512 unit pixel groups 203 included in each of the even-numbered lines from the volume data of time phase T2. In subsequent time phases, the second rendering control unit 1352*a* performs control so as to generate parallax image groups to be displayed on 512 unit pixel groups 203 included in each of the even-numbered lines in every other time phase from volume data of the time phase.

In other words, the first rendering control unit 1351*a* and the second rendering control unit 1352*a* perform control so as to generate the odd-numbered lines and the even-numbered lines of the unit pixel groups 203 aligned in the horizontal direction alternately in every other time phase. A display control unit 1353 updates the parallax image groups generated in each time phase alternately, and displays the parallax image groups on the display unit 132.

Similarly to the first embodiment, the update of the parallax image groups may be set arbitrarily. If the time phase at the start of display is determined to be time phase T0, for example, the first rendering control unit 1351*a* and the second rendering control unit 1352*a* generate parallax image groups to be displayed on the odd-numbered lines and the even-numbered lines, respectively, from volume data of time phase T0. The display control unit 1353 then displays the parallax image groups thus generated on the unit pixel groups 203 in the odd-numbered lines and the even-numbered lines. Subsequently, the display control unit 1353 updates the parallax image groups for the odd-numbered lines generated by the first rendering control unit 1351*a* and the parallax image groups for the even-numbered lines generated by the second rendering control unit 1352*a* alternately in every other time phase, and displays the parallax image groups on the display unit 132.

Alternatively, at the start of display, the display control unit 1353 displays parallax image groups generated from volume data of time phase T1 on the odd-numbered lines, and displays parallax image groups generated from volume data of time phase T2 on the even-numbered lines, for example. In subsequent time phases, the display control unit 1353 updates the parallax image groups for the odd-numbered lines and the parallax image groups for the even-numbered lines alternately in every other time phase, and displays the parallax image groups on the display unit 132.

The processing performed by a workstation 130 according to the second embodiment will now be described with reference to FIG. 13. FIG. 13 is a flow chart illustrating a process performed by the workstation 130 according to the second embodiment. As illustrated in FIG. 13, if the workstation 130 according to the second embodiment receives a request to sequentially generate and display multi-parallax images (Yes at Step S201), the control unit 135 determines whether a horizontal-direction culling display mode for generating and displaying parallax image groups for odd-numbered lines and even-numbered lines of unit pixel groups aligned in the horizontal direction alternately between continuous time-phase data is turned ON (Step S202).

If the horizontal-direction culling display mode is turned ON (Yes at Step S202), the first rendering control unit 1351a controls a rendering processing unit 136 so as to generate parallax image groups to be displayed on unit pixel groups 203 in the odd-numbered lines in every other time phase (Step S203).

The second rendering control unit 1352a controls the rendering processing unit 136 so as to generate parallax image groups to be displayed on unit pixel groups 203 in the even-numbered lines in time phases in which no parallax image groups are controlled to be generated by the first rendering control unit 1351a (Step S204).

Subsequently, the display control unit 1353 displays the parallax image groups generated by the control of the first rendering control unit 1351a and the parallax image groups generated by the control of the second rendering control unit 1352a on the display unit 132 while updating the parallax image groups alternately (Step S205), and the processing is terminated. The workstation 130 according to the second embodiment is in a standby mode until the workstation 130 receives a request to sequentially generate and display multi-parallax images (No at Step S201).

By contrast, if the horizontal-direction culling display mode is turned OFF (No at Step S202), the control unit 135 controls the rendering processing unit 136 so as to generate the same number of parallax image groups as the number of the unit pixel groups for each time phase (Step S206), and the processing is terminated.

Third Embodiment

The first embodiment and the second embodiment have been described above, but various forms of embodiments, which is different from the first embodiment and the second embodiment, can be embodied.

In the embodiments, the explanation has been made of the case where the workstation 130 performs rendering processing on volume data and displays parallax images thus generated. However, the disclosed technology is not limited thereto, and a medical image diagnosis apparatus 110 may perform rendering processing on volume data and display parallax images thus generated, for example. Alternatively, the medical image diagnosis apparatus 110 or a workstation 130 may perform rendering processing on volume data, and a terminal device 140 may display images.

In the embodiments, the explanation has been made of the case where the terminal device 140 displays a medical image acquired from the image storage device 120, for example. However, the disclosed technology is not limited thereto, and the terminal device 140 may be connected directly to the medical image diagnosis apparatus 110 or the workstation 130, for example.

In the embodiments, the explanation has been made of the case where the workstation 130 acquires volume data from the image storage device 120 and performs rendering processing on the volume data. However, the disclosed technology is not limited thereto, and the workstation 130 may acquire volume data from the medical image diagnosis apparatus 110 and perform rendering processing on the volume data, for example.

In the embodiments, the explanation has been made of the case where parallax images of odd-numbered parallax positions and parallax images of even-numbered parallax positions are generated in every other time phase. However, the disclosed technology is not limited thereto, and two parallax images whose parallax positions are adjacent to each other may be generated in every other time phase.

In the embodiments, the explanation has been made of the case where the odd-numbered parallax images and the even-numbered parallax images are updated alternately in every other time phase. However, the disclosed technology is not limited thereto, and the parallax images may be updated in every third time phase. As for the parallax images (1) to (9) illustrated in FIG. 10, for example, the parallax images (1), (4), and (7) may be updated in time phase T1, the parallax images (2), (5), and (8) may be updated in time phase T2, and the parallax images (3), (6), and (9) may be updated in a subsequent time phase. In a time phase subsequent thereto, the parallax images (1), (4), and (7) may be updated. The update described above may be applied to the case where sequential multi-parallax images are displayed at high speed (e.g., 30 frames per second), for example.

As described above, according to the embodiments, the image processing system, the image processing device, and the image processing method according to the present embodiments make it possible to display sequential multi-parallax images smoothly even if the sequential multi-parallax images are generated and displayed in real time.

The image processing system, the image processing device, and the image processing method according to the embodiments make it possible to display sequential multi-parallax images smoothly even if the sequential multi-parallax images are generated and displayed in real time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing system comprising:
   circuitry configured to perform as
      a first parallax image generation control unit configured to perform control so as to generate parallax images of every other point-of-view position in a parallax image group to be an image group which is generated by performing a volume rendering process on volume data while sequentially changing the point-of-view position by a predetermined parallactic angle from every other time-phase volume data;
      a second parallax image generation control unit configured to perform control so as to generate parallax images of different point-of-view positions from the point-of-view positions of which the parallax images are generated by the first parallax image generation control unit in the parallax image group from volume data of a different time-phase from the time-phase in which the parallax images are generated by the first parallax image generation control unit; and
      a display control unit configured to arrange the parallax images generated each by the first parallax image generation control unit and the second parallax image generation control unit in the point-of-view position order, display the parallax images arranged on a display unit to display a stereoscopic image by arranging and outputting the parallax image group in the point-of-view position order, and update the parallax images generated by the first parallax image generation control unit and the parallax images generated by the second parallax image generation control unit alternately.

2. An image processing device comprising:
circuitry configured to perform as
a first parallax image generation control unit configured to perform control so as to generate parallax images of every other point-of-view position in a parallax image group to be an image group which is generated by performing a volume rendering process on volume data while sequentially changing the point-of-view position by a predetermined parallactic angle from every other time-phase volume data;
a second parallax image generation control unit configured to perform control so as to generate parallax images of different point-of-view positions from the point-of-view positions of which the parallax images are generated by the first parallax image generation control unit in the parallax image group from volume data of a different time-phase from the time-phase in which the parallax images are generated by the first parallax image generation control unit; and
a display control unit configured to arrange the parallax images generated each by the first parallax image generation control unit and the second parallax image generation control unit in the point-of-view position order, display the parallax images arranged on a display unit to display a stereoscopic image by arranging and outputting the parallax image group in the point-of-view position order, and update the parallax images generated by the first parallax image generation control unit and the parallax images generated by the second parallax image generation control unit alternately.

3. An image processing method comprising:
performing control so as to generate parallax images of every other point-of-view position in a parallax image group to be an image group which is generated by performing a volume rendering process on volume data while sequentially changing the point-of-view position by a predetermined parallactic angle from every other time-phase volume data;
performing control so as to generate parallax images of different point-of-view positions from the point-of-view positions of which the parallax images are generated in the parallax image group from volume data of a different time-phase from the time-phase in which the parallax images are generated; and
arranging each of the generated parallax images in the point-of-view position order, displaying the parallax images arranged on a display unit to display a stereoscopic image by arranging and outputting the parallax image group in the point-of-view position order, and updating each of the generated parallax images alternately.

* * * * *